(12) United States Patent
Keshavarz et al.

(10) Patent No.: US 11,056,689 B2
(45) Date of Patent: Jul. 6, 2021

(54) TRANSITION METAL CYANIDE COORDINATION COMPOUNDS HAVING ENHANCED REACTION POTENTIAL

(71) Applicant: Natron Energy, Inc., Santa Clara, CA (US)

(72) Inventors: Majid Keshavarz, Pleasanton, CA (US); Colin Deane Wessells, Menlo Park, CA (US); Daniel Friebel, San Carlos, CA (US); Axel Eugene Jean Guyon, Avon (FR); Peter Benjamin Herman, San Jose, CA (US); Grace Marjorie Yee, Los Altos Hills, CA (US)

(73) Assignee: Natron Energy, Inc., Santa Clara, CA (US)

( * ) Notice: Subject to any disclaimer, the term of this patent is extended or adjusted under 35 U.S.C. 154(b) by 0 days.

(21) Appl. No.: 16/735,519

(22) Filed: Jan. 6, 2020

(65) Prior Publication Data

US 2020/0373576 A1    Nov. 26, 2020

Related U.S. Application Data

(63) Continuation of application No. 16/418,485, filed on May 21, 2019, now Pat. No. 10,529,987.

(51) Int. Cl.
*H01M 4/02* (2006.01)
*H01M 4/58* (2010.01)
(Continued)

(52) U.S. Cl.
CPC ............ *H01M 4/58* (2013.01); *H01M 4/136* (2013.01); *H01M 4/622* (2013.01); *H01M 4/625* (2013.01)

(58) Field of Classification Search
CPC ...................................................... H01M 4/02
See application file for complete search history.

(56) References Cited

U.S. PATENT DOCUMENTS 9,287,589 B2    3/2016    Wessells et al.
9,299,981 B1    3/2016    Motallebi et al.
(Continued)

OTHER PUBLICATIONS

Hyun-Wook Lee et al: "Maganese hexacyanomanganate open framework as a high-capacity positive electrode material for sodium-ion batteries", Nature Communications, Nature Publishing Group, United Kingdom, vol. 5, Oct. 14, 2014 (Oct. 14, 2014), pp. 5280-5281, XP002752587, ISSN: 2041-1723, DOI: 10.1038/NCOMMS6280 [retrieved Oct. 14, 2014].

(Continued)

*Primary Examiner* — Jacob B Marks
(74) *Attorney, Agent, or Firm* — Patent Law Offices Michael E. Woods; Michael E. Woods

(57) ABSTRACT

A system, method, and articles of manufacture for a surface-modified transition metal cyanide coordination compound (TMCCC) composition, an improved electrode including the composition, and a manufacturing method for the composition represented by $A_x Mn_y M_k^j [Mn^m(CN)_{(6)}]_z \cdot (Vac)_{(1-z)} \cdot n(CH_3OH)$ wherein A includes one or more alkali metals; and each dopant M may include at least one independently selected alkaline earth metal, a post-transition metal, or a transition metal having an average valence j; including one or more $Mn(CN)_6$ complexes each including an Mn atom; wherein (Vac) identifies a $Mn(CN)_6$ vacancy; wherein each particular $Mn(CN)_6$ complex includes the Mn atom bonded to a plurality of cyanide groups; and wherein $CH_3OH$ identifies methyl alcohol; and further including one or more crystal structures of the TMCCC composition.

10 Claims, 13 Drawing Sheets

(51) Int. Cl.
H01M 4/136 (2010.01)
H01M 4/62 (2006.01)

(56) References Cited

U.S. PATENT DOCUMENTS

| | | |
|---|---|---|
| 9,359,219 B1 | 6/2016 | Motallebi et al. |
| 10,529,987 B1 | 1/2020 | Keshavarz et al. |
| 2014/0127560 A1 | 5/2014 | Wessells et al. |
| 2014/0127592 A1 | 5/2014 | Wessells et al. |
| 2014/0220392 A1 | 8/2014 | Wessells et al. |
| 2014/0308544 A1 | 10/2014 | Wessells et al. |
| 2018/0105432 A1* | 4/2018 | Motallebi ................. C01C 3/11 |

OTHER PUBLICATIONS

Mauro Pasta et al: "Full open-framework batteries for stationary energy storage", Nature Communications, vol. 5, Jan. 6, 2014 (Jan. 6, 2014) pp. 3007-1, XP055150480, United Kingdom ISSN: 2041-1723, DOI: 10.1038/ncomms4007.

International Search Report for International application No. PCT/US2016/040209 with transmission date Oct. 31, 2016.

Written Opinion of the International Searching Authority for International application No. PCT/US2016/040209 transmitted Oct. 31, 2016.

U.S. Appl. No. 16/418,485, filed May 21, 2019, Majid Keshavarz et al.

* cited by examiner

TRANSITION METAL CYANIDE COORDINATION COMPOUNDS HAVING ENHANCED REACTION POTENTIAL

CROSS REFERENCE TO RELATED APPLICATIONS

This Application is a Continuation of application Ser. No. 16/418,485, now U.S. Pat. No. 10,529,987, filed on May 21, 2019 and this Application is related generally to U.S. patent application Ser. No. 15/859,160 which is a Continuation of Application PCT/US16/40209 filed on Jun. 29, 2016. Application PCT/US16/40209 is a Continuation of application Ser. No. 14/880,010 filed on Oct. 9, 2015. Application Ser. No. 14/880,010 is a Division of application Ser. No. 14/755,607 filed on Jun. 30, 2015. Application PCT/US16/40209 is a Continuation of application Ser. No. 14/755,607 filed on Jun. 30, 2015, the contents of all these applications are all hereby expressly incorporated by reference thereto in their entireties for all purposes.

FIELD OF THE INVENTION

The present invention relates generally to transition metal cyanide coordination compound (TMCCC) materials incorporated into electrochemical devices, such as an electrode, synthesized without water producing an anhydrous TMCCC electrode having improved electrochemical properties as compared to water-synthesized TMCCC materials.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

There is a trend in electrochemical cell design that requires a development of new materials for energy storage technologies to allow for safe, economic and energy efficient batteries. A number of cyanide-based transition metal compounds used as cathodes have been developed for organic and aqueous electrolytes.

Recent developments regarding cyanide-bridged coordination polymer electrodes for aqueous-based electrolyte batteries have revealed promising results. However, many challenges must be have addressed before cyanide-based transition metal compounds may be safely, economically and used in an energy efficiently manner in an anode, especially in an anode operated in an electrochemical cell having high energy density. Relatively high electrochemical reaction potentials of cyanide-based transition metal anode materials typically result in relatively low full cell voltages, and therefore, energy densities.

For example, manganese hexacyanomanganate anode material has an electrochemical reaction potential of −0.7 V vs. the standard hydrogen electrode (SHE). The combination of such an anode material with a cathode material having a typical electrochemical reaction potential of about 1.0 V vs. SHE results in a battery cell having a voltage of about 1.7 V. This is a relatively low voltage in comparison to other batteries, such as lead acid or lithium-ion batteries, which may have a cell voltage greater than 2 V. The energy density of a battery cell is proportional to the cell voltage. Therefore, the relatively high electrochemical potential of such an anode material renders the material less attractive as an anode active material despite its potential advantages due to its electrochemical properties.

Previously reported compositions of matter for TMCCC materials include a crystal structure having interstitial water. One use of TMCCC materials is an electrode (e.g., an anode) of an electrochemical device, particularly devices having relatively extended cycle life. One goal of electrode material innovations is to invent and develop materials having improved electrochemical potentials (e.g., an anode material having a more negative electrochemical potential or a cathode having a more positive electrochemical potential) and having improved properties enhancing use of the electrode material in a physical electrode or electrochemical cell having a high energy density.

Such innovations may include a system, method, and articles of manufacture for an improved transition metal cyanide coordination compound (TMCCC) composition, an improved electrode including the composition, and a manufacturing method for the composition, and materials for improving an electrochemical potential for a TMCCC electrode.

BRIEF SUMMARY OF THE INVENTION

Disclosed are systems, methods, and articles of manufacture for an improved transition metal cyanide coordination compound (TMCCC) composition, an improved electrode including the composition, and a manufacturing method for the composition, and materials for improving an electrochemical potential for a TMCCC electrode.

The following summary of the invention is provided to facilitate an understanding of some of the technical features related to transition metal cyanide coordination compound (TMCCC) materials incorporated into electrochemical devices, such as an electrode, synthesized without water producing an anhydrous TMCCC electrode having improved electrochemical properties as compared to water-synthesized TMCCC materials, and is not intended to be a full description of the present invention. A full appreciation of the various aspects of the invention can be gained by taking the entire specification, claims, drawings, and abstract as a whole. The present invention is applicable to other materials and processes and uses in other electrochemical devices.

An embodiment of the present invention may include anhydrous transition metal cyanide coordination compounds (TMCCCs) having a composition of matter including interstitial methanol, rather than the previously reported interstitial water. This TMCCC may undergo a reversible electrochemical cycling at a more negative electrochemical potential than the potentials of previously reported materials, such as those having interstitial water. Implementations of these methanol-containing TMCCC material embodiments may be used as anodes to increase a voltage and energy of electrochemical cells employing such TMCCC material compositions.

An embodiment of the present invention may include a final composition of matter, optionally incorporated into a component of an electrochemical device (e.g., an anode), or synthesis thereof, having a general formula (Formula I): $A_x Mn_y M_k^j [Mn^m(CN)_{(6)}]_z \cdot (Vac)_{(1-z)} \cdot n(CH_3OH)$ wherein A includes one or more alkali metals Li, Na, or K; and each dopant M may include at least one independently selected alkaline earth metal Mg or Ca, a post-transition metal Al, Ga, In, Sn, or Pb, or a transition metal Sc, Ti, V, Cr, Fe, Co, Ni, Cu, Zn, Pd, Ag, or Cd having an average valence j; and wherein $0<j\leq4$, $0\leq k\leq0.1$, $0<x\leq4$, $0<y\leq1$, $0<z\leq1$, and $0<n\leq4$; wherein $x+2(y-k)+jk+(m-6)z=0$; wherein Formula I includes one or more $Mn(CN)_6$ complexes each including an Mn atom; wherein m is an average valence of said Mn atoms found in said one or more Mn(CN)6 complexes; wherein (Vac) identifies a $Mn(CN)_6$ vacancy; wherein each particular $Mn(CN)_6$ complex includes said Mn atom bonded to a plurality of cyanide groups; wherein $CH_3OH$ identifies methyl alcohol; and in some embodiments further including one or more crystal structures of Formula I.

An embodiment of the present invention for a TMCCC material may include an interstitial organic solvent such as methyl alcohol. Use of such TMCCC materials in an electrode used in a battery may provide an enhanced battery with an increased voltage and energy.

An embodiment of the present invention may include agglomerations/conglomerations of fine TMCCC grains into larger particles. The TMCCC material grains enhance a surface area when used in an electrode which improve charge transfer. The conglomerations enhance packaging efficiency when forming a physical electrode from the finely grained TMCCC material.

Materials disclosed herein may be used in battery cells that also contain aqueous electrolytes, or anhydrous organic electrolytes, or cosolvent electrolytes that contain both water and organic solvents.

A material, including at least one composition represented by Formula I: $A_xMn_yM_k^j[Mn^m(CN)_{(6)}]_z\cdot(Vac)_{(1-Z)}\cdot n(CH_3OH)$ Formula I; wherein, in Formula I, A includes one or more alkali metals Li, Na, or K; and each dopant M may include at least one independently selected alkaline earth metal Mg or Ca, a post-transition metal Al, Ga, In, Sn, or Pb, or a transition metal Sc, Ti, V, Cr, Fe, Co, Ni, Cu, Zn, Pd, Ag, or Cd having an average valence j; and wherein $0<j\leq4$, $0\leq k\leq0.1$, $0<x\leq4$, $0<y\leq1$, $0<z\leq1$, and $0<n\leq4$; wherein $x+2(y-k)+jk+(m-6)z=0$; wherein Formula I includes one or more $Mn(CN)_6$ complexes each including an Mn atom; wherein m is an average valence of the Mn atoms found in the one or more Mn(CN)6 complexes; wherein (Vac) identifies a $Mn(CN)_6$ vacancy; wherein each particular $Mn(CN)_6$ complex includes the Mn atom bonded to a plurality of cyanide groups; wherein $CH_3OH$ identifies methyl alcohol; and further including one or more crystal structures of Formula I.

An electrode, including a current collector; and a composite applied on the current collector, the composite including an electrochemically active material having a composition, a binder, and an electrically conductive material, wherein the composition comprises at least one composition represented by Formula I.

Any of the embodiments described herein may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

Other features, benefits, and advantages of the present invention will be apparent upon a review of the present disclosure, including the specification, drawings, and claims.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

Figure 1:
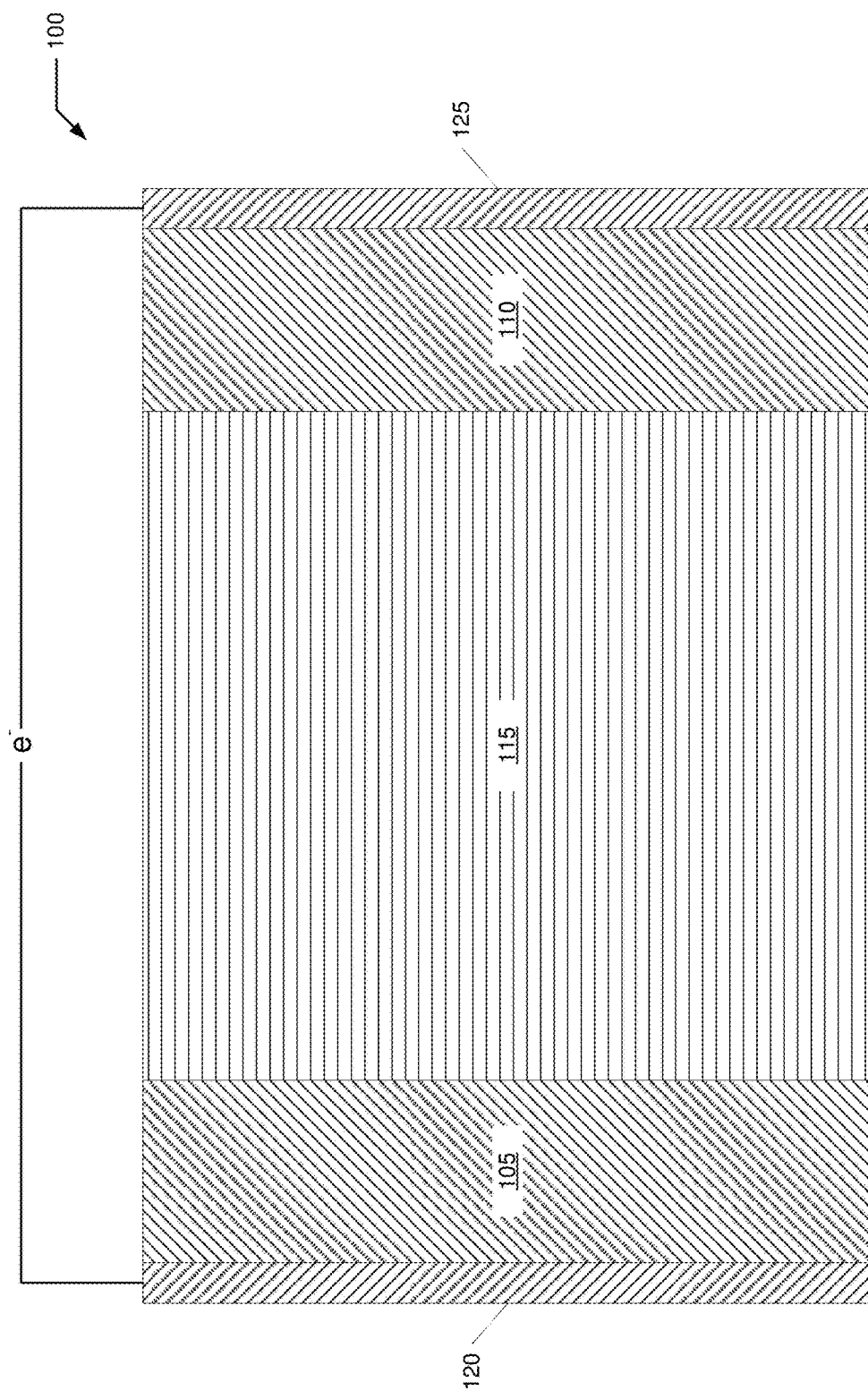
FIG. 1 illustrates a representative secondary electrochemical cell schematic having one or more anhydrous TMCCC electrodes disposed in contact with an electrolyte.

Embodiments of the present invention provide systems, methods, and articles of manufacture for an improved transition metal cyanide coordination compound (TMCCC) composition, an improved electrode including the composition, and a manufacturing method for the composition. The following description is presented to enable one of ordinary skill in the art to make and use the invention and is provided in the context of a patent application and its requirements.

Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Definitions

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The following definitions apply to some of the aspects described with respect to some embodiments of the invention. These definitions may likewise be expanded upon herein.

As used herein, the term "or" includes "and/or" and the term "and/or" includes any and all combinations of one or more of the associated listed items. Expressions such as "at least one of," when preceding a list of elements, modify the entire list of elements and do not modify the individual elements of the list.

As used herein, the singular terms "a," "an," and "the" include plural referents unless the context clearly dictates otherwise. Thus, for example, reference to an object can include multiple objects unless the context clearly dictates otherwise.

Also, as used in the description herein and throughout the claims that follow, the meaning of "in" includes "in" and "on" unless the context clearly dictates otherwise. It will be understood that when an element is referred to as being "on" another element, it can be directly on the other element or intervening elements may be present therebetween. In contrast, when an element is referred to as being "directly on" another element, there are no intervening elements present.

As used herein, the term "set" refers to a collection of one or more objects. Thus, for example, a set of objects can include a single object or multiple objects. Objects of a set also can be referred to as members of the set. Objects of a set can be the same or different. In some instances, objects of a set can share one or more common properties.

As used herein, the term "adjacent" refers to being near or adjoining. Adjacent objects can be spaced apart from one another or can be in actual or direct contact with one another. In some instances, adjacent objects can be coupled to one another or can be formed integrally with one another.

As used herein, the terms "connect," "connected," and "connecting" refer to a direct attachment or link. Connected objects have no or no substantial intermediary object or set of objects, as the context indicates.

As used herein, the terms "couple," "coupled," and "coupling" refer to an operational connection or linking. Coupled objects can be directly connected to one another or can be indirectly connected to one another, such as via an intermediary set of objects.

As used herein, the terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels or variability of the embodiments described herein.

The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of ±10 percent of the given numeric value provided such a deviation does not alter the end function or result of the value. Therefore, a value of about 1% can be construed to be a range from 0.9% to 1.1%.

As used herein, the terms "optional" and "optionally" mean that the subsequently described event or circumstance may or may not occur and that the description includes instances where the event or circumstance occurs and instances in which it does not.

As used herein, the term "size" refers to a characteristic dimension of an object. Thus, for example, a size of an object that is spherical can refer to a diameter of the object. In the case of an object that is non-spherical, a size of the non-spherical object can refer to a diameter of a corresponding spherical object, where the corresponding spherical object exhibits or has a particular set of derivable or measurable properties that are substantially the same as those of the non-spherical object. Thus, for example, a size of a non-spherical object can refer to a diameter of a corresponding spherical object that exhibits light scattering or other properties that are substantially the same as those of the non-spherical object. Alternatively, or in conjunction, a size of a non-spherical object can refer to an average of various orthogonal dimensions of the object. Thus, for example, a size of an object that is a spheroidal can refer to an average of a major axis and a minor axis of the object. When referring to a set of objects as having a particular size, it is contemplated that the objects can have a distribution of sizes around the particular size. Thus, as used herein, a size of a set of objects can refer to a typical size of a distribution of sizes, such as an average size, a median size, or a peak size.

As used herein, the term energy density refers to energy storage of an electrochemical device and may be categorized as high energy density or low energy density. "Low energy density" means a device having an energy density, a volumetric energy density, of less than 100 Wh/L and "high energy density" means a device having an energy density of 100 Wh/L or greater.

Figure 2:
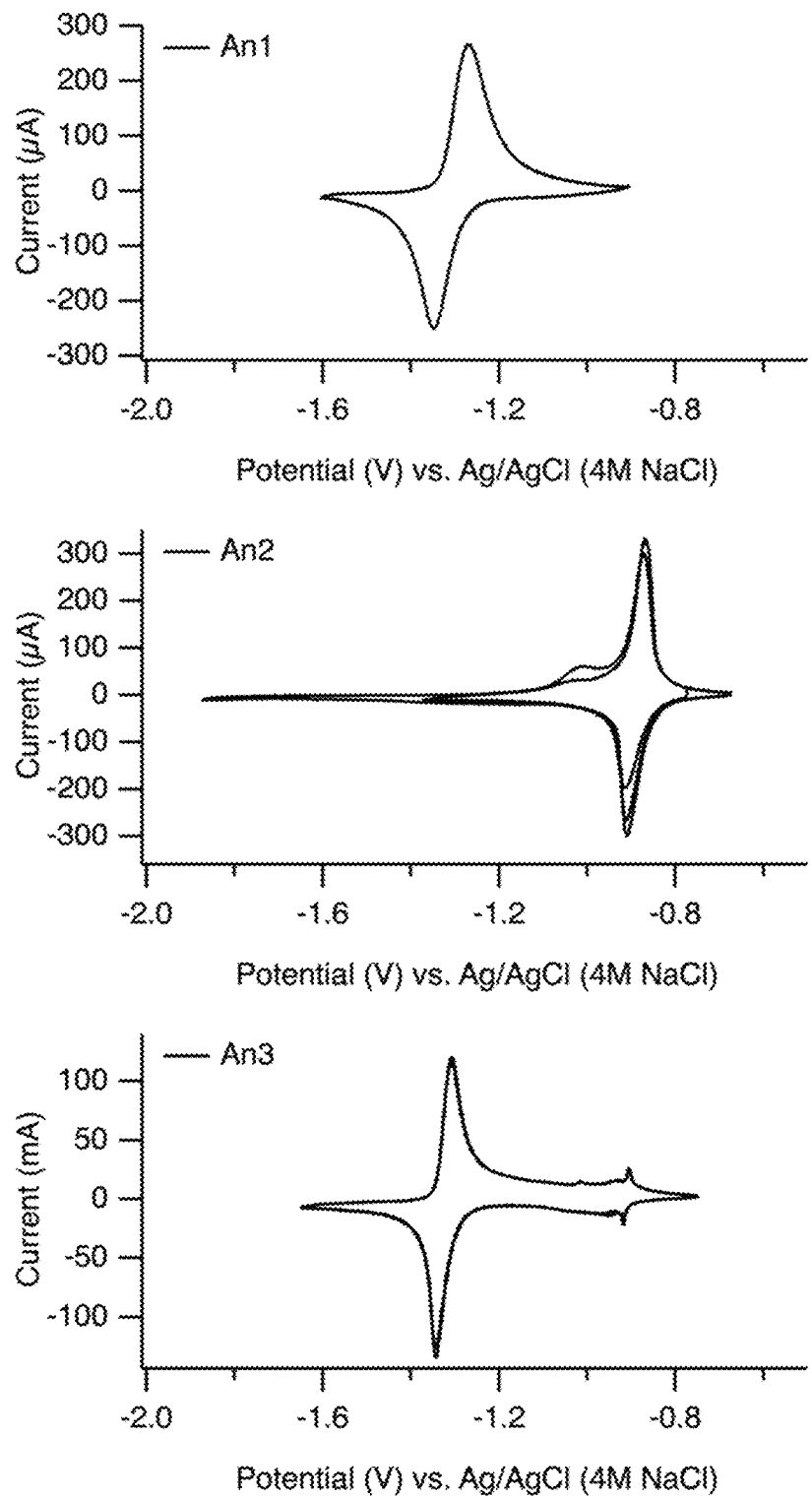
FIG. 2 illustrates a set of cyclic voltammetry scans for three different anode materials, the anodes identified as An1, An2, and An3.

As used herein, the term "anhydrous" in the context of a synthesized TMCCC material, means a water content of less than 1.0 percent of the total weight of the material. In FIG. 2 (discussed below), anhydrous material loses 0.5% of its mass during heating to 300° C. Water evaporates from the sample when it is heated, therefore a maximum amount of any water impurity in the material was 0.5%.

FIG. 1 illustrates a representative secondary electrochemical cell 100 schematic having one or more anhydrous TMCCC electrodes disposed in contact with an electrolyte as described herein. Cell 100 includes a negative electrode 105, a positive electrode 110 and an electrolyte 115 electrically communicated to the electrodes. One or both of negative electrode 105 and positive electrode 110 include anhydrous TMCCC as an electrochemically active material. A negative current collector 120 including an electrically conductive material conducts electrons between negative electrode 105 and a first cell terminal (not shown). A positive current collector 125 including an electrically conductive material conducts electrons between positive electrode 110 and a second cell terminal (not shown). These current collectors permit cell 100 to provide electrical current to an external circuit or to receive electrical current/energy from an external circuit during recharging. In an actual implementation, all components of cell 100 are appropriately enclosed, such as within a protective housing with current collectors externally accessible. There are many different options for the format and arrangement of the components across a wide range of actual implementations, including aggregation of multiple cells into a battery among other uses and applications.

Anhydrous Anodes

An embodiment of the present invention includes a new type of hexacyanomanganate-based transition metal cyanide coordination compound (TMCCC) material that has a new composition of matter. This material is new in part because its composition includes an interstitial organic small molecule (for example, methyl alcohol). Described herein is a synthesis of this new TMCCC material using a method involving a reaction of chemical precursors in methyl alcohol. This synthesis is fundamentally different than the previously reported TMCCC syntheses that were performed in water and that resulted in TMCCC materials that had compositions that included water. These new materials and methods produce an anhydrous TMCCC material for which any water present may be considered an undesired impurity.

Described herein are four synthesized TMCCC compositions structured for use as an anode in an electrochemical cell (An1, An2, An3, and An4). Presence of methyl alcohol in the material used in the fabrication of one of these anodes may result in an electrochemical reaction potential of −1.3 V vs. the silver/silver-chloride reference electrode (Ag/AgCl, 4 M NaCl). This reaction potential is 0.4 V more negative than the −0.9 V electrochemical reaction potential of previously reported TMCCC anode materials synthesized using water. Having a more negative reaction potential is a desirable characteristic for an anode material because the resulting higher cell voltage also results in higher stored energy. The anhydrous TMCCC materials described herein can be used as a negative electrode (anode) material in an electrochemical cell in combination with a cathode to create a cell having a higher voltage and higher energy than could be achieved using previously reported TMCCC anode materials.

Electrochemical data of previous TMCCC materials (e.g., hydrous TMCCC anodes) shows that these materials have reaction potentials of −0.7 V vs. SHE, which is equal to −0.9 V vs. Ag/AgCl (the reference electrode used herein). See Reference 1. Note there is a 0.2 V difference between SHE and Ag/AgCl as used herein, see Reference 2.

Anode An4 includes material (synthesized by a method) that is included in the incorporated and related patent U.S. patent application Ser. No. 15/859,160, and that describes TMCCC materials in general, as well as the idea of a TMCCC that includes a chelating group in its composition, with a resulting improvement in environmental stability.

Achieving such a low reaction potential demonstrated for some embodiments of this invention used in anode materials, three criteria are fulfilled for TMCCC materials having the improved electrochemical potential: 1) the resulting TMCCC material is anhydrous; 2) a synthesis of the anhydrous TMCCC material includes small alkali cations; and 3) the anhydrous TMCCC material contains a small molecule organic molecule, such as methyl alcohol, inside its crystal structure.

First, it was observed that a presence of water in the disclosed embodiments of the TMCCC crystal structure result in the synthesized TMCCC material exhibiting the previously reported reaction potential of about −0.9 V vs. Ag/AgCl in contrast to the −1.3 V. To synthesize anhydrous TMCCC material, methanol was used in place of water as the solvent during synthesis of the material.

Second, the TMCCC material was synthesized as a composition containing alkali cations that are smaller than the interstices in the TMCCC structure, leaving additional empty space in the crystal structure for methanol to occupy.

Third, the presence of alkali cations that are smaller than the interstices in the TMCCC structure results in leaving additional empty space in the crystal structure that allows for occupation by a small organic molecule such as methanol.

The following discussion and presentation of a set of data demonstrates that the synthesized anhydrous TMCCC may contain methanol in the case that it contains sodium ions, but not in the case that it contains larger potassium ions. Sodium ions have a relatively small ionic radius of 1.1 Å, while potassium ions have a larger ionic radius of 1.4 Å. In the case that the anhydrous TMCCC material contains only sodium ions and methanol, an electrochemical reaction is observed at about −1.3 V vs. Ag/Cl (Example An1). In the case that the anhydrous TMCCC material contains potassium ions but no methanol, it undergoes an electrochemical reaction at about −0.9 V vs. Ag/AgCl (Example An2). Finally, in the case that the anhydrous TMCCC material contains sodium ions, methanol, and potassium ions, it undergoes electrochemical reactions at both −1.3 V and −0.9 V vs. Ag/Cl (Example An3). FIG. 2 illustrates a set of three cyclic voltammetry scans for three different anode materials, the anodes identified as An1, An2, and An3 with these anode materials further discussed in the context of FIG. 3-FIG. 13.

To demonstrate that certain of the disclosed anode materials were totally anhydrous, Fourier transform infra-red (FTIR) spectroscopy was performed. FTIR is commonly used for materials composition analysis because it is sensitive to bonding vibrational modes that are readily assignable to different chemical groups (CN, OH, and the like). Those different chemical groups have vibrational spectra at different energies, which makes the presence of each type of chemical group visible in the FTIR spectrum of the sample.

Figure 3:
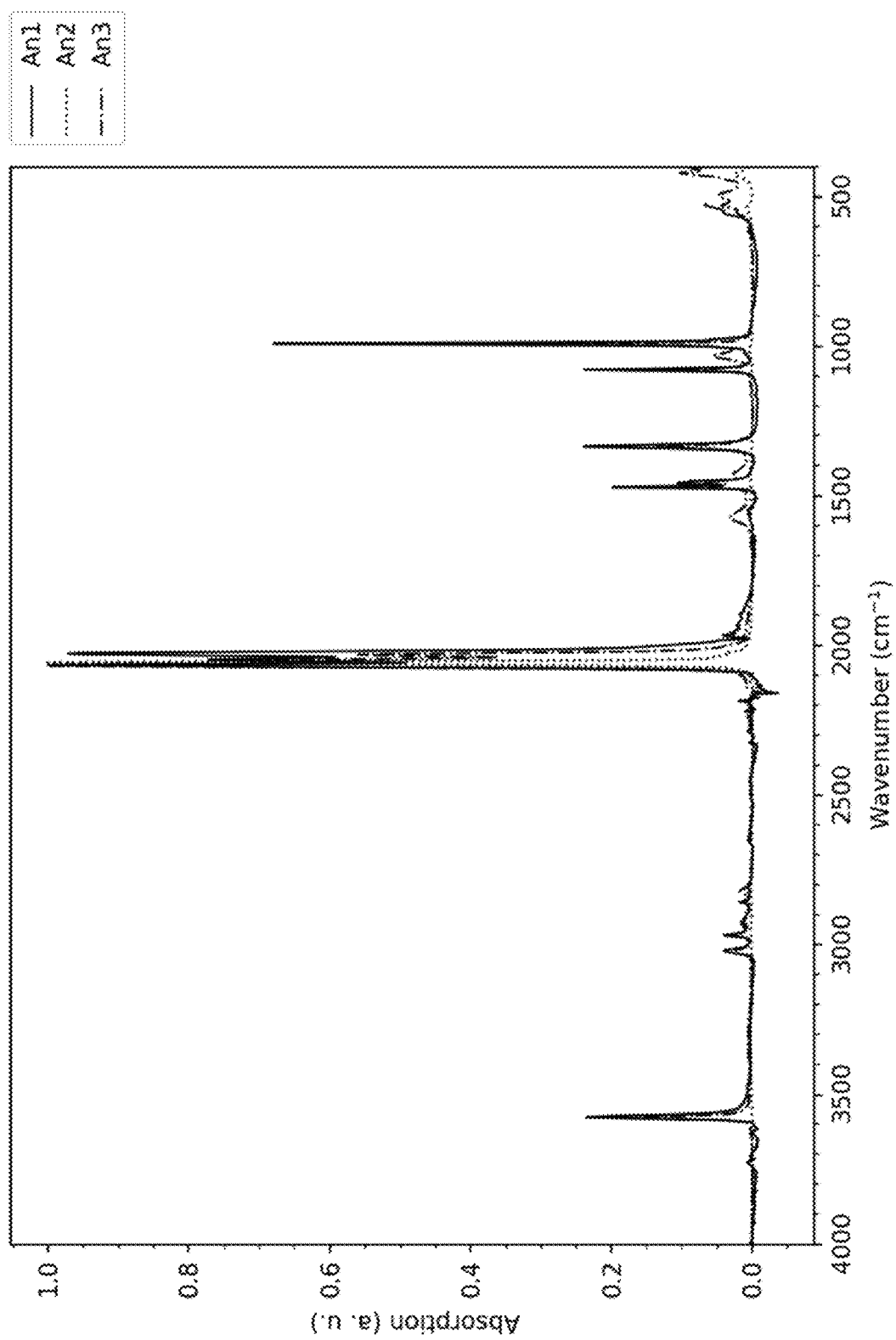
FIG. 3 illustrates a Fourier transform infrared (FT-IR) spectra for an An1 material, an An2 material, and an An3 material.
Figure 4:
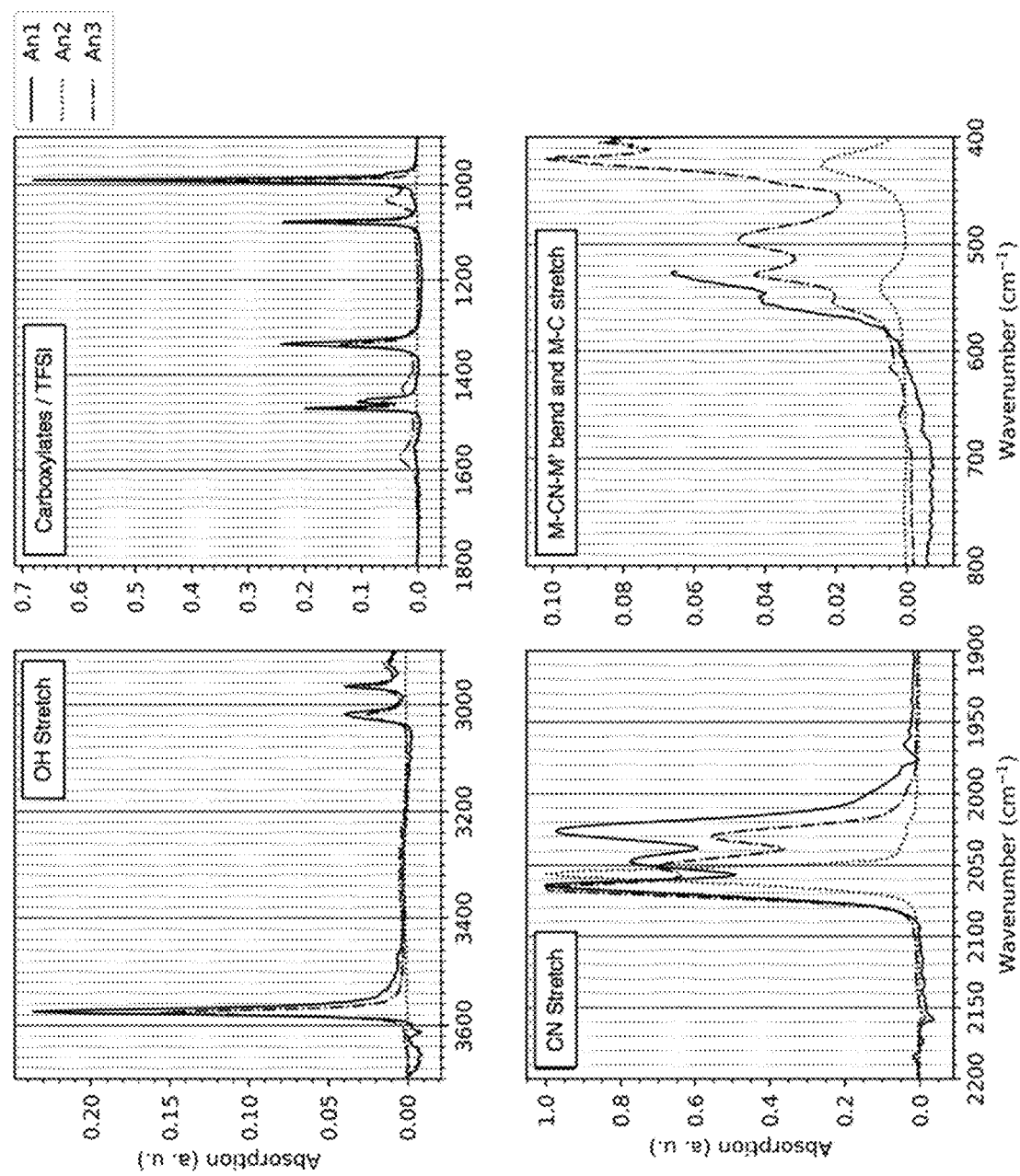
FIG. 4 illustrates a set of charts identifying functional groups for FT-IR spectra from an absorption analysis of An1, An2, and An3 materials.

The FTIR spectra of materials An1, An2, and An3 each lack the spectral features of hydrated TMCCC materials such as An4, which indicates that these materials An1-An3 are anhydrous. FIG. 3 illustrates a Fourier transform infrared (FT-IR) spectra for an An1 material, an An2 material, and an An3 material, FIG. 4 illustrates a set of charts identifying functional groups for FT-IR spectra from an absorption analysis of An1, An2, and An3 materials, FIG. 5 illustrates a chart of FTIR spectra from an absorption analysis of An1, An3, An4, and methanol materials, and FIG. 6 illustrates a chart of FTIR spectra from an absorption analysis of methanol.

Figure 5:
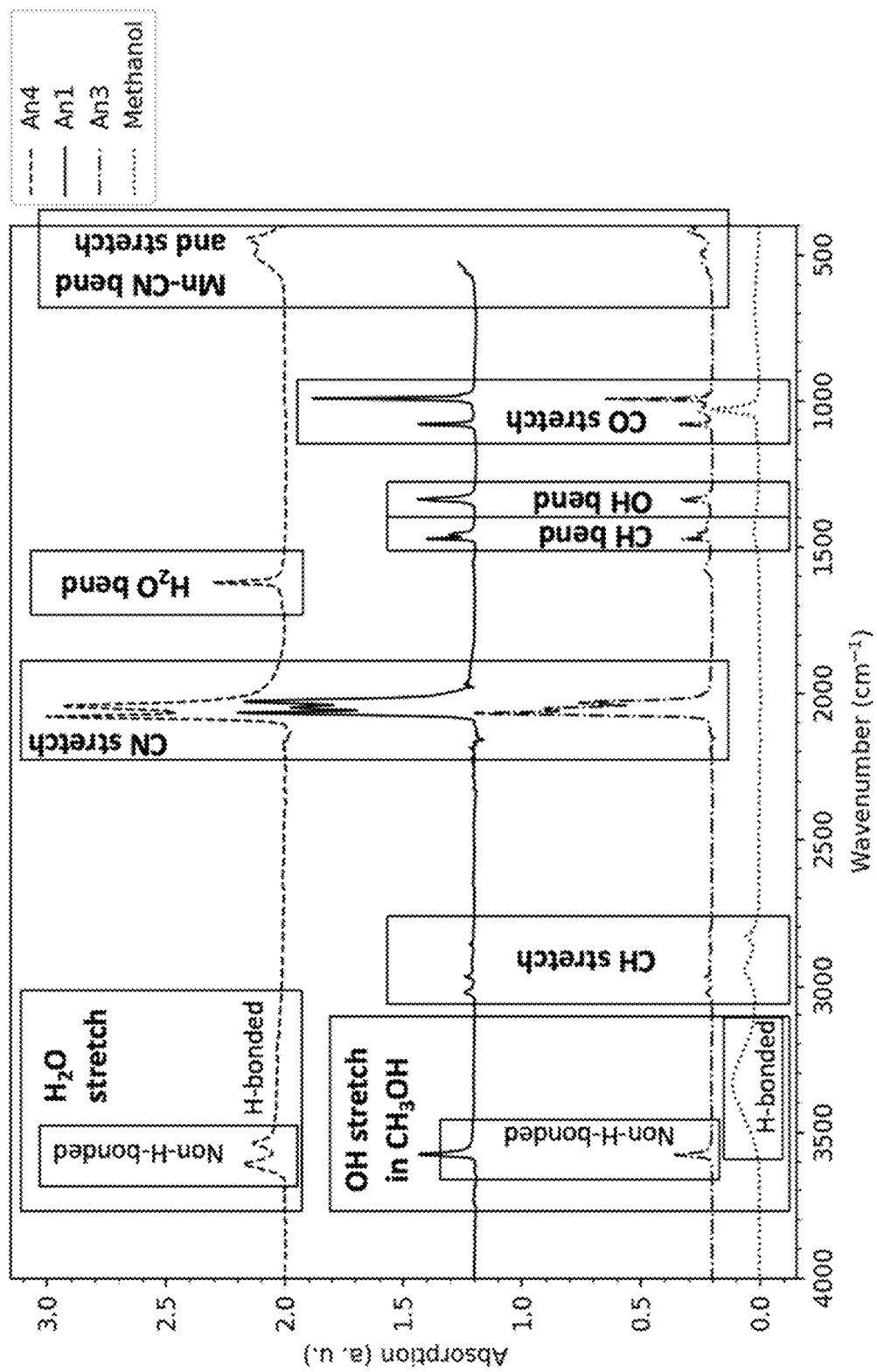
FIG. 5 illustrates a chart of FT-IR spectra from an absorption analysis of An1, An3, An4, and methanol materials.
Figure 6:
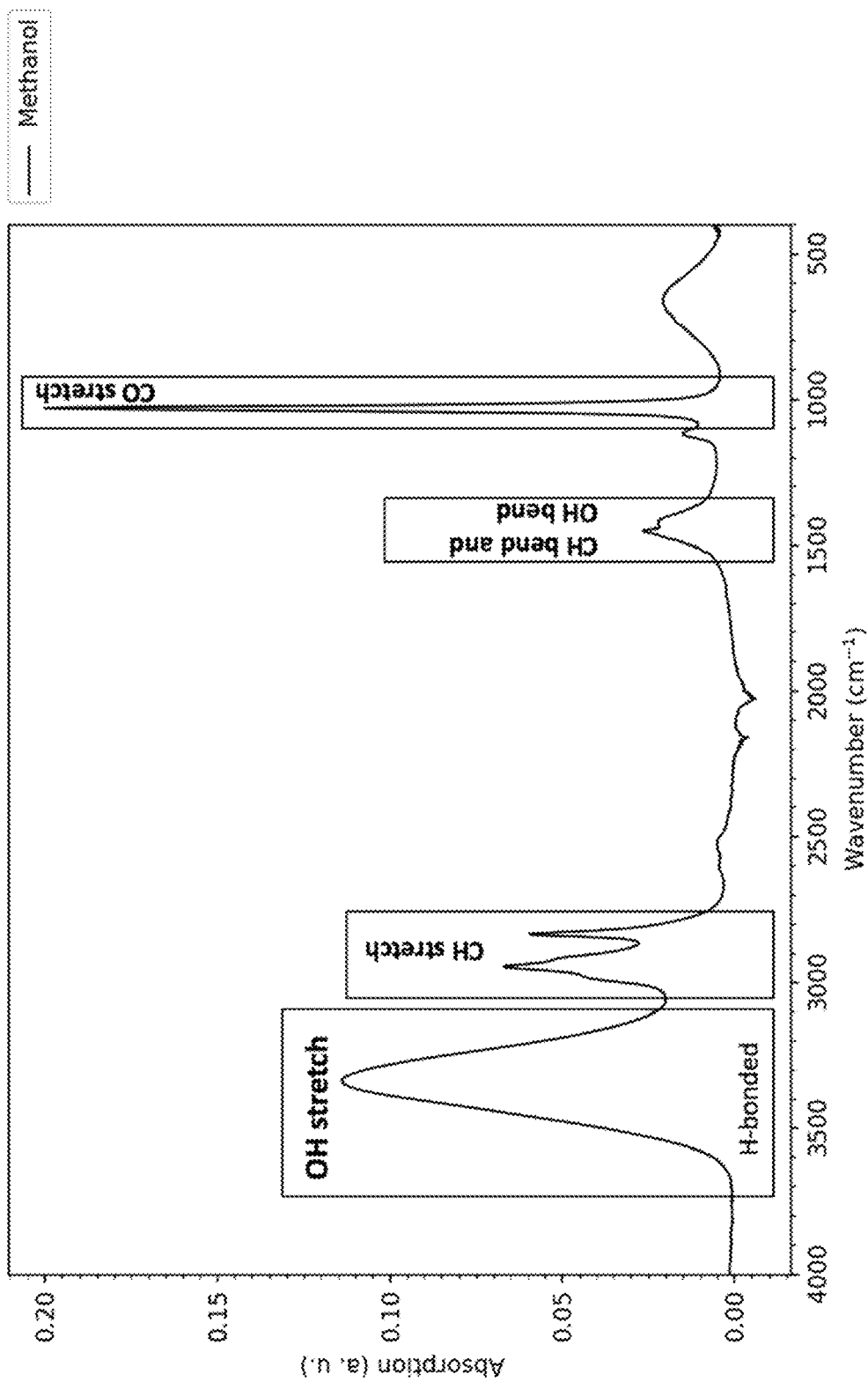
FIG. 6 illustrates a chart of FT-IR spectra from an absorption analysis of methanol.

For example, as shown in FIG. 5, the broad peaks near 3600 cm-1 and the sharp peak at 1700 cm-1 that are present for hydrated material An4 are not present in anhydrous materials An1 and An3. The FTIR spectra of materials An1 and An3 each contain peaks that can be assigned to OH stretching modes, but not the $H_2O$ bending mode (FIG. 5). In addition, the have additional peaks between 1000 cm-1 and 1500 cm-1 not found in the spectrum of the hydrous material, and these peaks are consistent with peaks observed in the spectrum of pure methanol. Together, these results indicate the presence of methanol, rather than water in the structure. In contrast, the FTIR spectrum of material An2 includes no peaks that can be assigned to OH stretching (FIG. 4), indicating that material An2 is both anhydrous and does not contain methanol.

Figure 7:
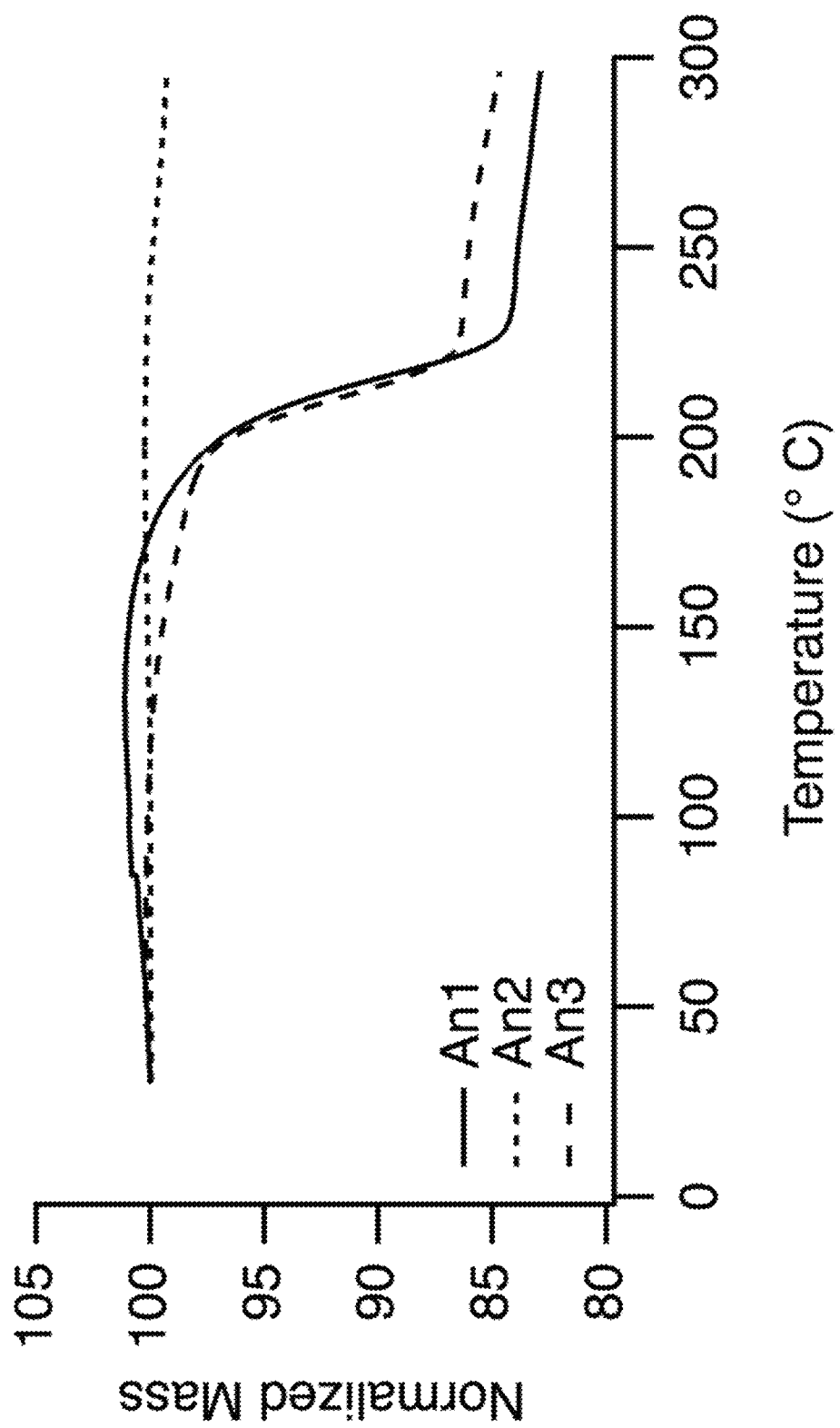
FIG. 7 illustrates a thermogravimetric analysis (TGA) scan of An1, An2, and An3 materials.

FIG. 7 illustrates a thermogravimetric analysis (TGA) scan of An1, An2, and An3 materials with thermogravimetric analysis (TGA) was performed on materials An1, An2, and An3. The TGA scans of An1 and An3 show a mass loss of 15-20% between 150° and 250° C., while material An2 undergoes a negligible change in mass up to 300°. These results are consistent with the loss of methanol from An1 and An3 when they are heated.

Figure 8:
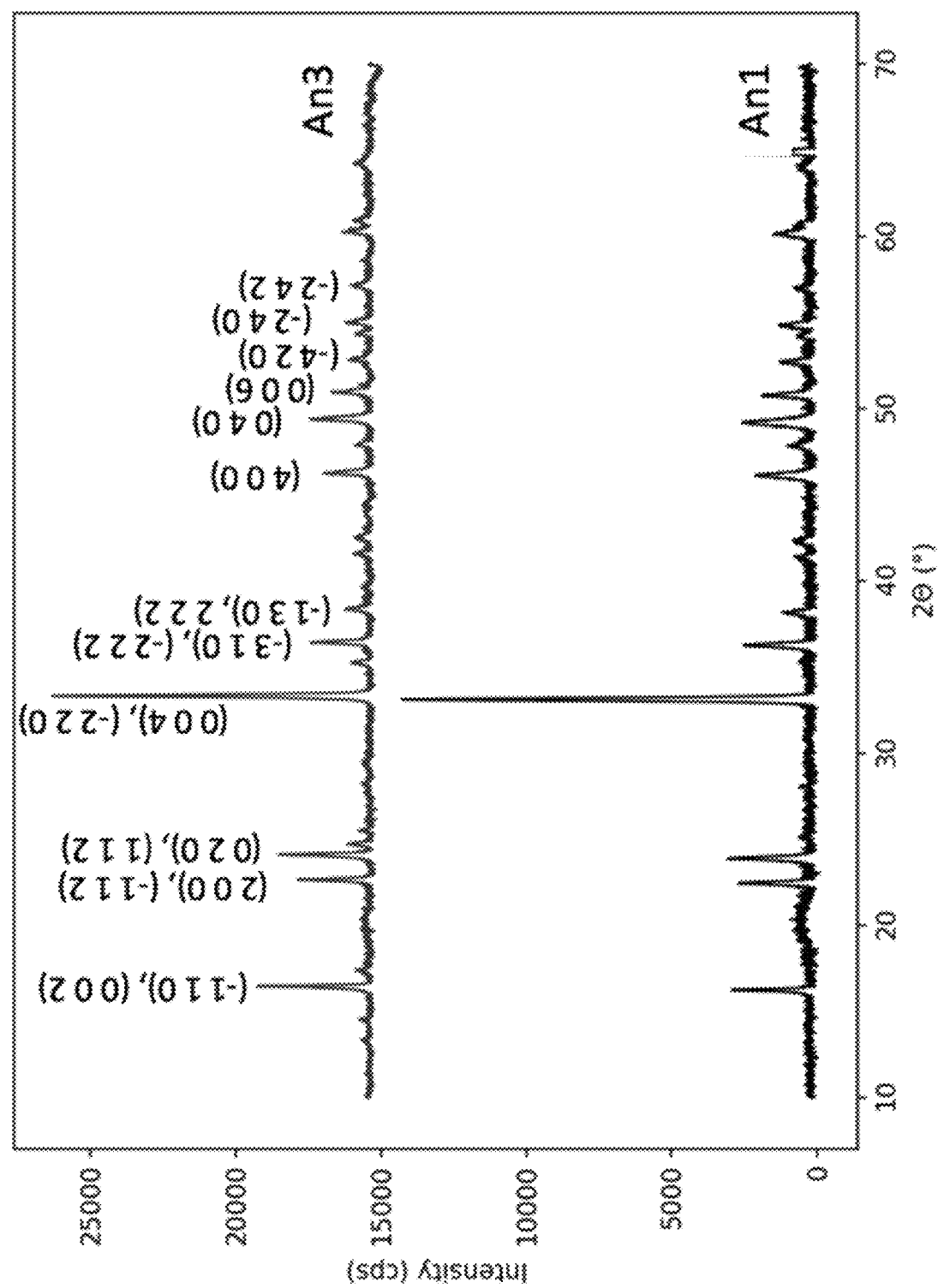
FIG. 8 illustrates X-ray diffraction (XRD) spectra for An1 and An3 materials.
Figure 9:
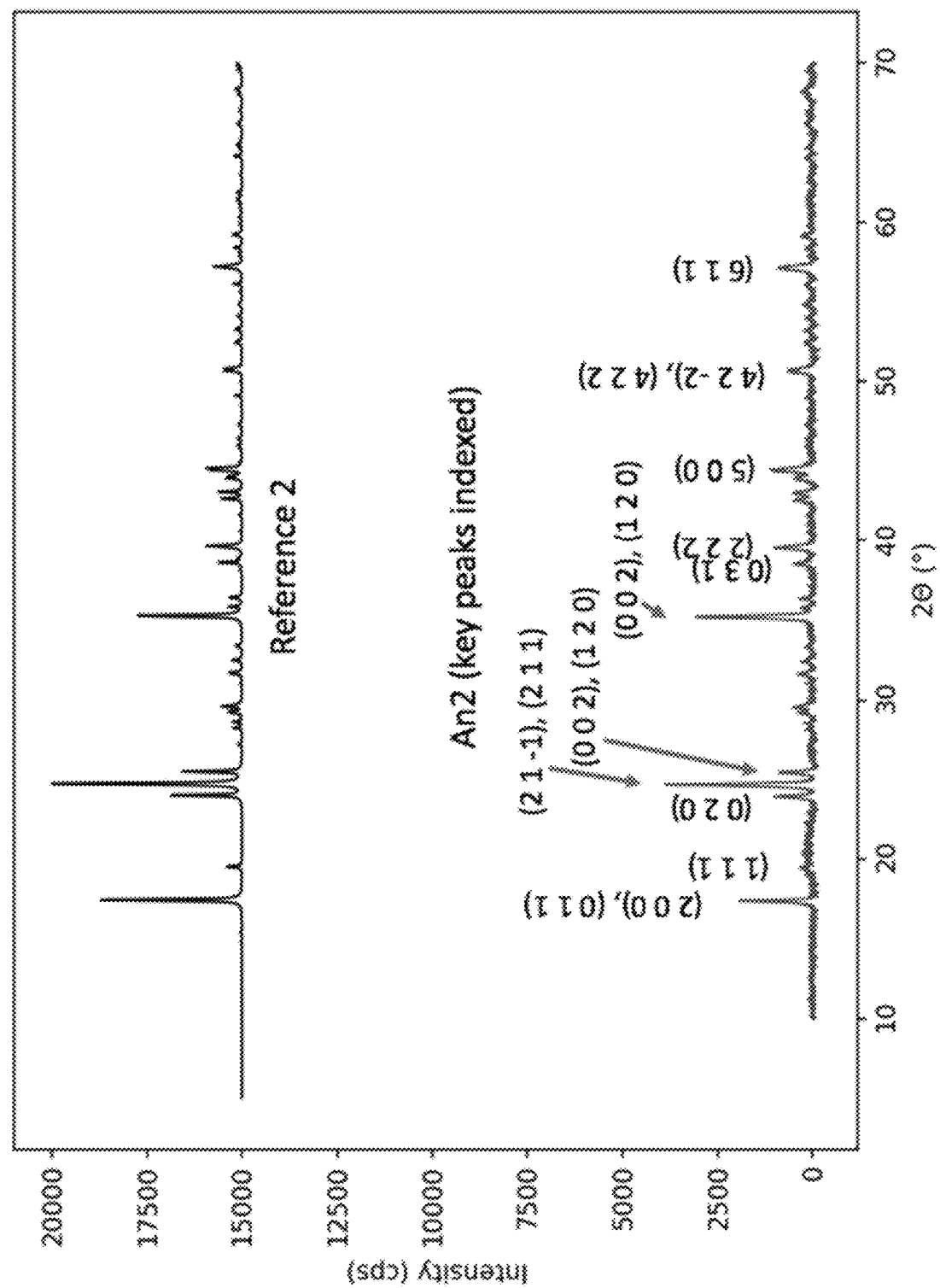
FIG. 9 illustrates the XRD spectrum for an An2 material in comparison to a reference diffraction spectrum for reference material 4.

FIG. 8 illustrates X-ray diffraction (XRD) spectra for An1 and An3 materials; and FIG. 9 illustrates the XRD spectrum for an An2 material in comparison to a reference diffraction spectrum for a reference material 2. The materials containing methanol have a unique crystal structure not previously reported. The diffraction spectra of materials An1 and An3 are shown in FIG. 8, while the diffraction spectra of An2 and a reference spectrum from the reference material are shown in FIG. 9. Materials An1 and An3 have a spectrum that can be indexed to a unique monoclinic phase, lattice parameters a=7.891 Å, b=7.378 Å, c=10.801 Å, $\beta$=95.08°. The crystal structure of materials An1 and An3 are different from previously reported monoclinic phases of hexacyanomanganate-based TMCCC materials, for which $\beta$=92.44° or less (References 3-4). Furthermore, the diffraction pattern of An2, the material containing no methanol or water, was indexed to a monoclinic phase having $\beta$=90.21° (Reference 4). The greater the difference between $\beta$ and 90°, the greater the distortion of the $Mn(CN)_6$ octahedra in the structure, which is consistent with the presence of interstitial small molecules such as methanol.

Methanol molecules are larger than water molecules. Including interstitial methanol rather than water in a TMCCC material results in a bigger effect such as a greater distortion of a crystal structure. In a conventional TMCCC material that contains interstitial water, those water molecules are small enough that they have little effect on the structure and the distortion is small. In the case that a larger molecule such as methyl alcohol is inside the structure, its larger size causes distortion of a much larger magnitude than is ever observed due to the presence of water. A practical limit on the size of this small interstitial molecule present in a TMCCC structure is the size of the largest interstitial sites present in the structure, including any effect of distortion of the structure as a result of the presence of that small molecule on the size of that largest interstitial site. In practice, the largest interstitial sites in a TMCCC structure have a radius of about 2.5 Å to 3.5 Å.

Figure 10:
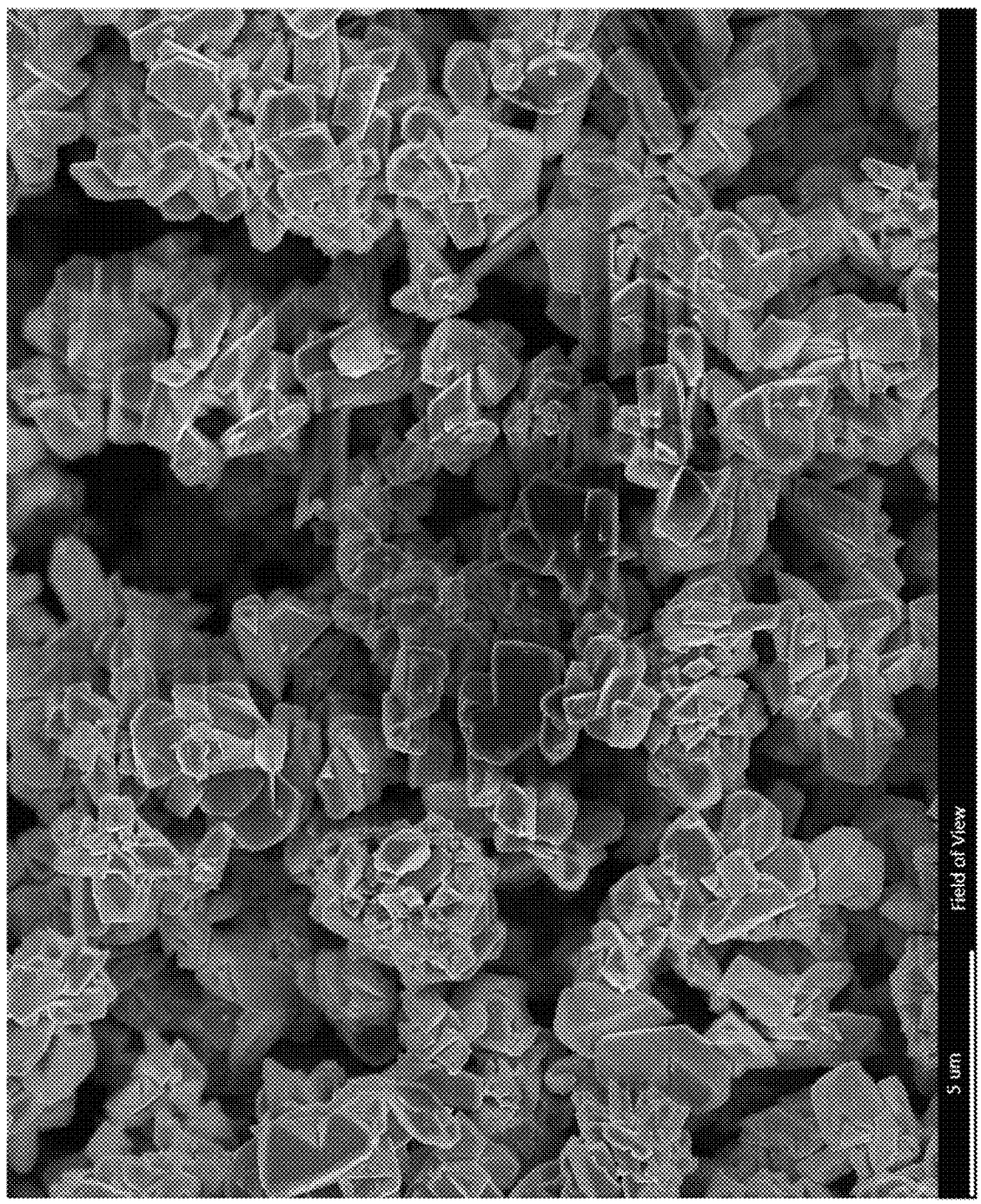
FIG. 10 illustrates a scanning electron microscopy (SEM) image of the An1 material.
Figure 11:
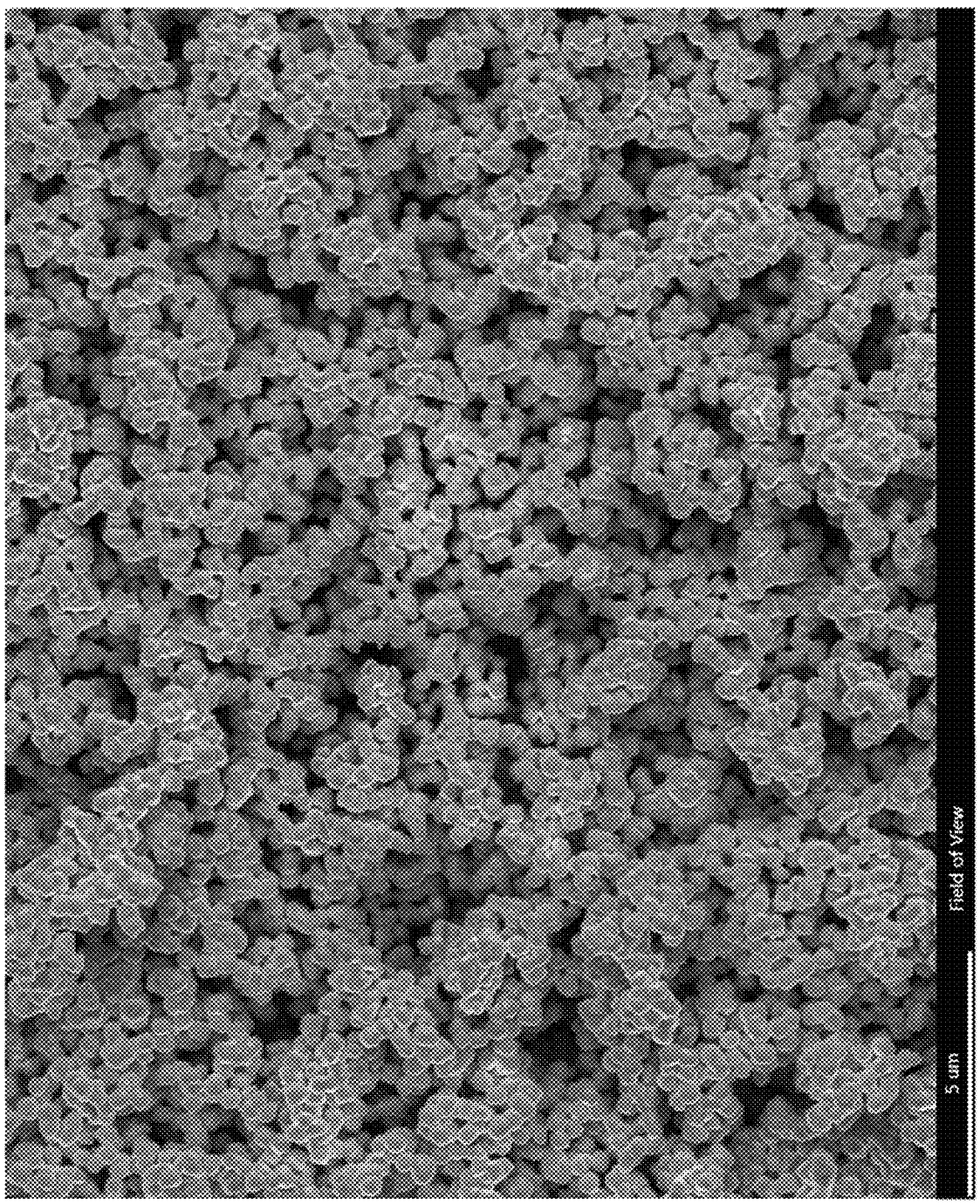
FIG. 11 illustrates a scanning electron microscopy (SEM) image of the An2 material.
Figure 12:
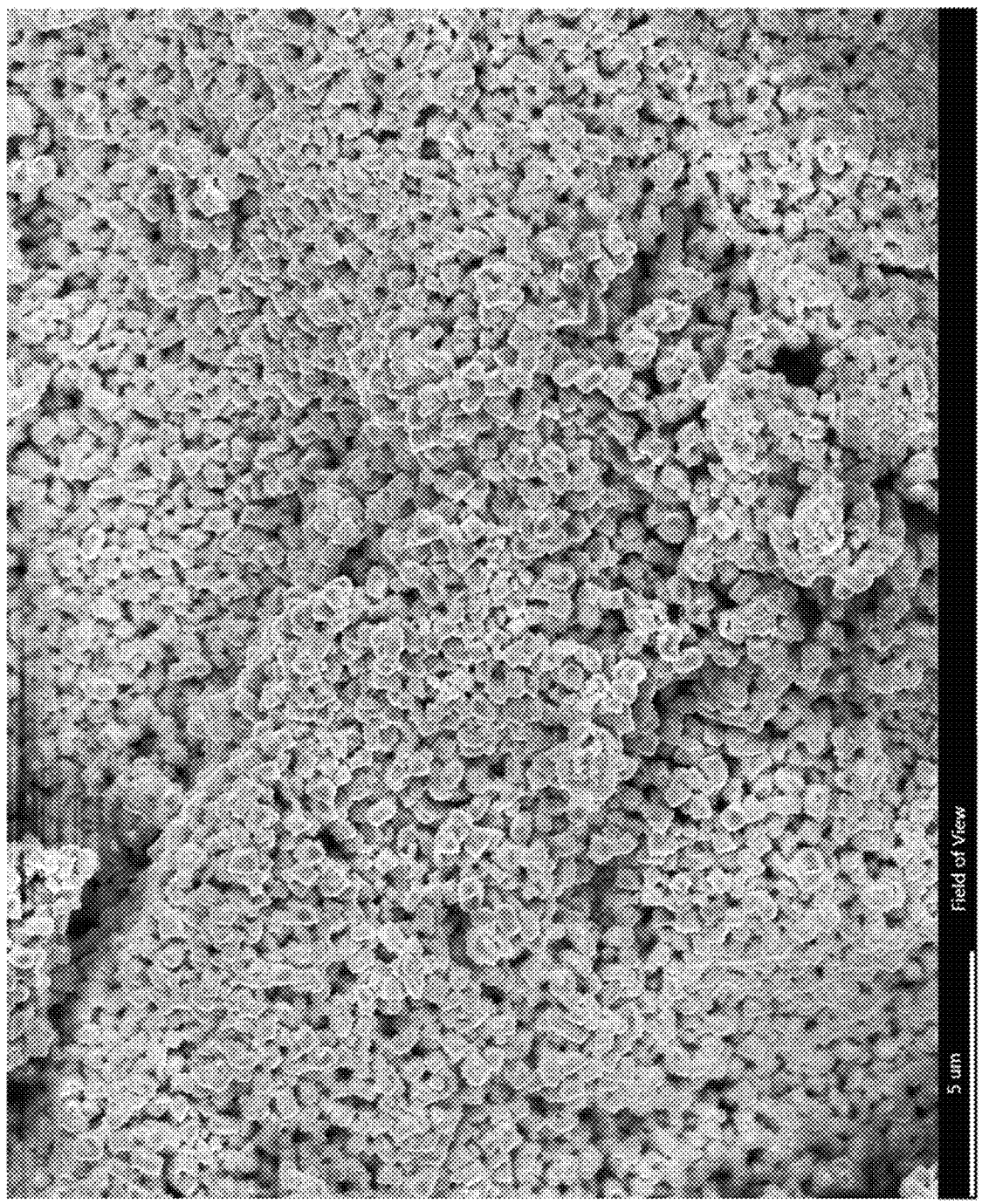
FIG. 12 illustrates a scanning electron microscopy (SEM) image of the An3 material.
Figure 13:
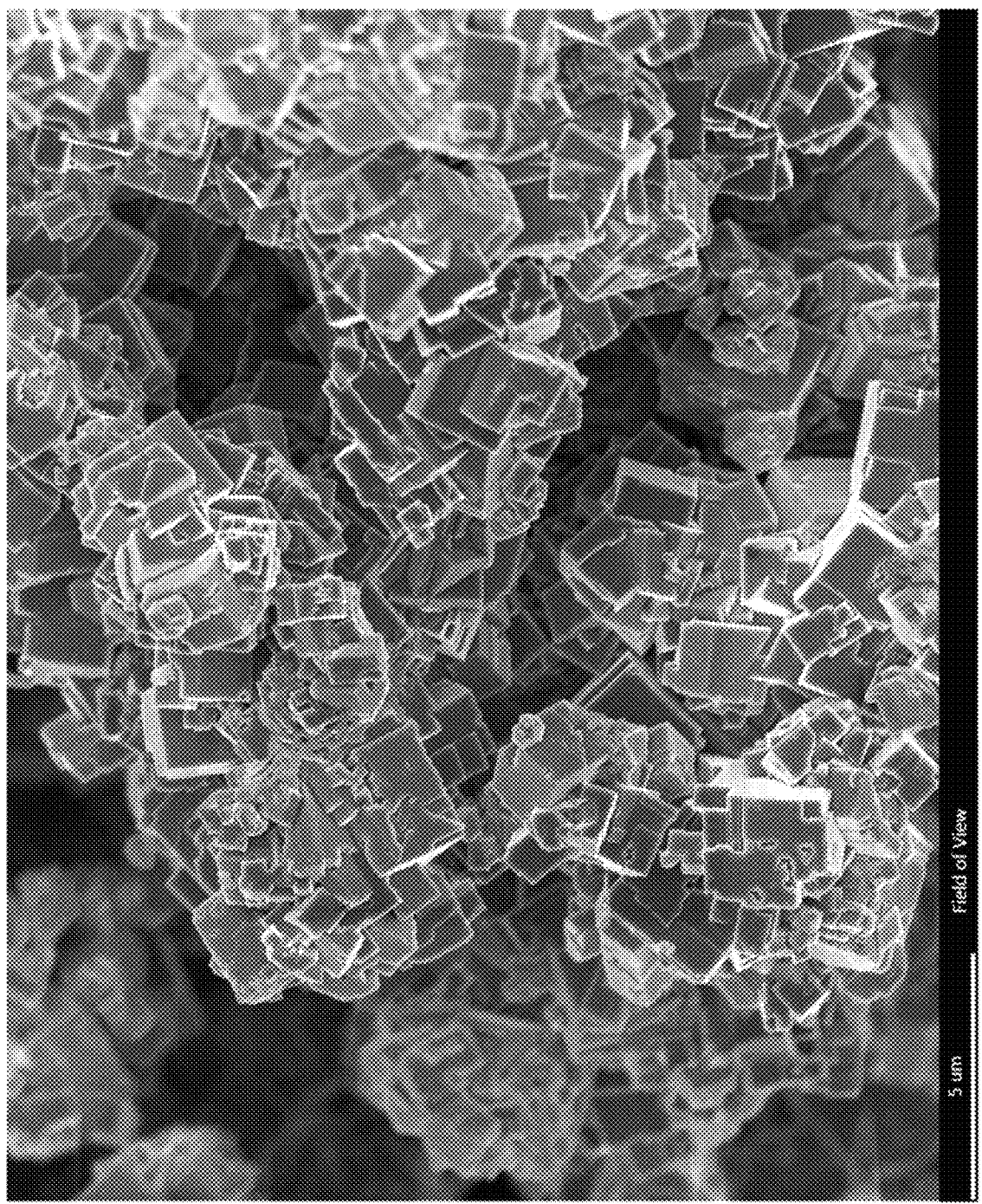
FIG. 13 illustrates a scanning electron microscopy (SEM) image of the An4 material.

FIG. 10 illustrates a scanning electron microscopy (SEM) image of the An1 material; FIG. 11 illustrates a scanning electron microscopy (SEM) image of the An2 material; FIG. 12 illustrates a scanning electron microscopy (SEM) image of the An3 material; and FIG. 13 illustrates a scanning electron microscopy (SEM) image of the An4 material. Scanning electron microscopy was performed on each material to determine its particle morphology, with two aspects of particular interest: a size of primary crystal grains, and a size of secondary agglomerations of those grains. These are shown in FIG. 10-FIG. 13 for materials An1, An2, An3, and An4.

FIG. 10, material An1 is composed of primary crystal grains having a size of 500 nm to 3 μm, which are in turn bonded into secondary agglomerates having a size of 5-10 μm.

In FIG. 11, material An2 is composed of primary crystal grains having a size of about 500 nm and which are not agglomerated into secondary structures.

In FIG. 12, material An3 is composed of primary crystal grains having a size of about 500 nm, some of which are bonded into secondary agglomerates having a size of 2-5 μm.

In FIG. 13, material An4 is composed of primary crystal grains having a size of about 1-2 μm and that are bonded into agglomerates having a size of greater than 10 μm.

Both the primary size and secondary size of the particles are important for successful processing of the raw materials into battery electrodes and for achieving a high-performance battery. Nanoparticulate crystal grains (size <100 nm) have a high surface area, which results in a low surface charge transfer resistance and high battery performance. However, that high surface area makes processing into electrodes via common wet slurry methods challenging because more solvent is needed to wet the surface of the powder. On the other hand, large primary crystal grains (>10 μm) may be limited in their performance by a high surface charge resistance and by the rate of diffusion of charge carriers throughout the grain. Therefore, primary grain size should be optimized to balance processability with device performance.

The size of the secondary agglomerates of the grains may also be optimized to achieve acceptable processability and device performance. In the case of small agglomerates (1-10 μm), or even no agglomerates of the primary grains, a larger quantity of carbon and adhesive polymer binder is typically required to produce an electrode meeting physical and electrical requirements such as the ability to be bent or folded without cracking, as well as having an acceptably low electronic resistance. The greater the amount of carbon and binder in the electrode, the less active material present, and therefore, the lower the capacity and energy density of the electrode. In contrast large agglomerates (>50 μm) that have a size approaching the thickness of the entire electrode may cause increased electrode surface roughness, which in turn can cause device failures such as a short circuit through the separator between the electrodes. Therefore, secondary agglomerate size should be optimized to balance device performance with electrode quality.

Example An1:

To a stirred solution of sodium cyanide (24.7 g, 0.504 mol, 3.5 mol equiv.) in methanol (1.5 L), a solution of anhydrous manganese acetate (25 g, 0.145 mol, 1 mol equiv.) in methanol (800 mL) was added at a constant rate over 5 minutes at room temperature under nitrogen atmosphere. The solution was then stirred overnight and subsequently filtered and washed with methanol (2 L). The isolated material was dried under vacuum at room temperature for 18 hours to produce 15.0 g of blue powder. All steps were performed under nitrogen atmosphere.

Example An2:

To a stirred solution of potassium cyanide (13.1 g, 0.201 mol, 3.4 mol equiv.) in methanol (600 mL), a solution of anhydrous manganese acetate (10 g, 0.058 mol, 1 mol equiv.) in methanol (200 mL) was added at a constant rate over 5 minutes at room temperature under nitrogen atmosphere. The solution was then stirred for 3.0 hours and subsequently filtered and washed with methanol (1 L). The isolated material was dried under vacuum at room temperature for 18 hours to produce 8.0 g of green powder. All steps were performed under nitrogen atmosphere.

Example An3:

To a stirred solution of potassium cyanide (1.3 g, 0.02 mol, 0.34 mol equiv.) and sodium cyanide (8.9 g, 0.182 mol, 3.1 mol equiv.) in methanol (470 mL), a solution of anhydrous manganese acetate (10 g, 0.058 mol, 1 mol equiv.) in methanol (200 mL) was added at a constant rate over 5 minutes at room temperature under nitrogen atmosphere. The reaction was then stirred for 3.0 hours and subsequently filtered and washed with methanol (1 L). The isolated material was dried under vacuum at room temperature for 18 hours to produce 7.0 g of light blue powder. All steps were performed under nitrogen atmosphere. A composition of material An3 was analyzed using ICP-OES and CHN analysis methods. The atomic weight percentages measured by this analysis are found in Table 1 below. The material An3 was found to have a composition of $Na_{1.30}K_{0.31}Mn_{1.00}[Mn(CN)_6]_{0.78}(CH_3OD)_{1.72}$, which is included in the general composition of Formula I.

TABLE 1

Results of Elemental Analysis of Material An3.

| Species | Weight percent (%) | Moles, normalized to $(CN)_6$ |
|---|---|---|
| C | 24.21 | 8.22 |
| N | 20.61 | 6 |
| H | 1.78 | 7.20 |
| O | 8.56 | 2.18 |
| K | 3.79 | 0.40 |
| Na | 9.34 | 1.66 |
| Mn | 30.80 | 2.28 |

Example An4:

Two solutions of sodium cyanide (93 g, 1.9 mol, 3.2 mol equiv.) in water (286 mL) and manganese acetate tetrahydrate (145 g, 0.6 mol, 1 mol equiv.) in water (296 mL) were made under inert Glovebox atmosphere. To a 2 L half-jacketed reactor at 20° C. was added 1% of the total manganese acetate solution, furthermore, was added the two solutions simultaneously over 10 minutes at room temperature to yield a dark blue precipitate. The reaction mixture was then stirred for 1.0 hour and subsequently filtered and washed with a mixture of acetic acid and methanol (107 mL/161 mL) followed by methanol (840 mL). After 1.0 hour of drying, filter cake was washed with a solution of oxalic acid (16 g, 0.12 mol, 0.2 mol equiv.) in isopropanol (807 mL). After 1.0 hour of drying in a vacuum filter, the isolated material was further dried in a vacuum oven at 75° C. for 16 hours to produce 90 g of dark blue powder. All steps were performed under nitrogen atmosphere.

TMCCC materials containing small interstitial organic molecules are able to be processed into composite battery electrodes in a number of ways. These composite battery electrodes may also include one or more conductive additives such as carbons, and one or more polymer binders. This general process involves the mixing of the TMCCC with the carbons and binders in one or more organic solvents. That mixing may be performed at low or high shear rates to optimize the dispersion of the TMCCC, carbon, and binder in the solvents. After mixing, the resulting slurry may be coated onto a substrate such as a mesh or foil. Those substrates may be metal or surface-modified metal such as carbon-coated aluminum. Coating may be performed using a blade-over-roll coater, a slot-die coater, an extrusion coater, or another type of coater. After coating, the coated substrate is dried by one or more of the following: convective heating, infrared heating, convective airflow, or another drying process. The result of the drying process is a composite electrode on the substrate. That composite electrode may then be densified using a roll press such as a calendar press.

For each example active material (An1, An2, An3, and An4), electrodes were prepared by mixing the active material powder with carbon black and either a polyvinylidene difluoride binder in a solvent of n-methyl pyrrolidinone, or a styrene-butadiene copolymer binder in a solution of butanol and xylenes. The electrodes were prepared with a mass ratio of 8:1:1 active material powder, carbon black, and binder. The resulting slurry was spread on a substrate made of either carbon felt or carbon coated aluminum foil and then dried in a vacuum oven at a temperature of approximately 100° C. Variations of this electrode preparation process may be used to achieve enhanced electrode performance. These variations may include selection of various conductive carbons or combinations of conductive carbons including but not limited to carbon black, graphite, or hard carbon, or selection of various binders or combinations of binders including but not limited to vinylfluoride/hexafluoropropylene copolymer, polyvinylidenefluoride (PVDF), polyacrylonitrile, polymethylmethacrylate, polytetrafluoroethylene, or styrene butadiene rubber-based polymer. Variations of this electrode preparation process may also include the temperature, duration, and pressure during electrode drying.

The resulting electrodes were assembled into three-electrode electrochemical cells that also contained a sealed Ag/AgCl reference electrode, an activated charcoal counter electrode (auxiliary electrode), and an anhydrous electrolyte that included acetonitrile solvent and 0.8 M sodium bis(trifluoromethane)sulfonimide (NaTFSI) salt. Electrochemical tests including galvanostatic cycling and cyclic voltammetry were performed on these cells using a programmable battery tester.

These TMCCC electrodes may be combined with other counter electrodes capable of undergoing an electrochemical reaction at higher or lower potential to produce a cell having non-zero voltage. Counter electrodes may include sodium-ion electrodes such as TMCCC cathodes, layered transition metal oxides such as sodium manganese oxide, transition metal phosphates such as sodium vanadium phosphate, other ceramic electrodes containing electrochemically active transition metals, metals capable of alloying with sodium, including tin, antimony, and lead, and carbons including graphitic, hard, or soft carbons. Counter electrodes may also include electrodes that undergo an electrochemical reaction with a cation different from sodium, such as lithium or potassium, including lithium-ion electrode materials including layered oxides such as lithium cobalt oxide, transition metal phosphates such as lithium iron phosphate, alloys capable of undergoing reactions with lithium, such as silicon, and carbons including graphite.

These TMCCC electrodes may further be combined with other electrolyte solvents and electrolyte salts. Other organic electrolyte solvents that are electrochemically inactive in the operating electrochemical potential range of the TMCCC electrode and the counter electrode may be used in a practical cell. These solvents include nitriles such as succinonitrile or propionitrile, carbonates including propylene carbonate or dimethyl carbonate, sulfones including sulfolane and dimethyl sulfone, sulfoxides including dimethyl sulfoxide, amides including dimethylformamide, ethers including glymes including diglyme, triglyme, tetraglyme, 1,4-dioxane, or 1,3-dioxolane, lactones including gamma-valerolactone, glycol ethers including methylene glycol monoethylether, or other solvents, or a combination thereof. Other electrolyte salts that are soluble in the electrolyte solvent and that are electrochemical inactive in the operating electrochemical potential range of the TMCCC electrode and the counter electrode may be used in a practical cell. These salts may include sodium hexafluorophosphate, sodium tetrafluoroborate, sodium perchlorate, sodium (trifluoromethane)sulfonimide, sodium 4,5-dicyano-2-(trifluoromethyl)imidazolide, or other sodium salts, or a combination thereof. Furthermore, as the TMCCC electrode or its counterelectrode may undergo electrochemical reactions with other cations such as lithium, potassium, or magnesium, these salts may include lithium, potassium, or magnesium salts of tetrafluoroborate, perchlorate, (fluoromethane)sulfonimide, (trifluoromethane)sulfonimide, 4,5-dicyano-2-(trifluoromethyl)imidazolide, or a combination thereof. Furthermore, these TMCCC electrodes may be operated in aqueous electrolytes containing water in a concentration greater than that associated with impurities, such as 2% or more, or in electrolytes including one or more ionic liquids, including but not limited to an ionic liquid including (trifluoromethane)sulfonimide.

Described herein is a particular organic solvent that has been used in the synthesis. This organic solvent is methyl alcohol and has been demonstrated to produce desirable characteristics for TMCCC materials as described and suggested herein. Currently, requirements for this organic solvent are believed to be a transition metal salt of manganese (II) such as $MnSO_4$, $Mn(NO_3)_2$, $MnCl_2$, and the like, that it be at least slightly soluble in it, and that an alkali cyanide salt such as NaCN or KCN is at least slightly soluble in it. With these conditions met, these precursors are able to react to form the composition of matter described herein. For the organic solvent to be included in this composition of matter, it is believed to be necessary that it include a very small molecule that is able to be incorporated into interior void spaces of a crystal structure of the TMCCC material. Currently methyl alcohol and formaldehyde are known to produce the described TMCCC material.

A TMCCC material as described herein containing a small organic molecule could also be processed or synthesized using a surface treatment that introduces a chelating group into its chemical formula as described and taught by the incorporated related patent application Ser. No. 15/859,160.

Described herein is not only a particular TMCCC material with special characteristics, but also a special morphology that improves electrochemical performance when incorporating this material into a battery electrode (e.g., an anode). The electrochemical performance of such an electrode may depend significantly upon this morphology which addresses one or more of a particle size, a distribution of particle sizes, a shape, roughness, surface texture, and the like, of these particles. Particles that are too large undergo electrochemical reactions very slowly which limits performance of the associated battery. Particles that are too small are difficult to communicate with electrically, so there are sometimes "dead" particles in an electrode that are not part of an electric circuit defining the operation of the electrochemical cell, and therefore can never charge or discharge, or charge/discharge properly. The formation of particularly-sized particles that are agglomerations of smaller particularly-sized grains of TMCCC materials offers advantages of both solutions: the smaller individual grains are able to undergo electrochemical reactions quickly and due to their agglomerations into larger particles, it is easier to process the particles into electrodes. All the agglomerates (particles) and the grains making up those particles, are in the electrical circuit of the cell. So, a hierarchical morphology of fine grains that are agglomerated together results in an electrode that can be cycled quickly and in which there is a minimal amount of material that cannot charge and discharge. The particulars of the sizes of the grains and particles and their incorporation into one or more electrodes of an electrochemical cell is complex and may depend upon design goals and performance specifications.

While a focus of the presently claimed invention relates to a composition of matter that is both nominally anhydrous (Formula I—does not include water) and that includes an organic solvent which the synthesis was performed (e.g., methyl alcohol and the like). Based upon a current understanding of the present invention and current art, it is believed that described herein is a first successfully and reproducible synthesis of an anhydrous TMCCC material. Previously, TMCCC syntheses have been performed in water and result in hydrous materials. As noted herein, embodiments of the present invention are performed in an organic solvent and produce an anhydrous material. An important consideration is that a concentration of the described synthesis precursors are many orders of magnitude more concentrated than any water impurity that may be present during this synthesis. This is one way to achieve the desired anhydrous TMCCC materials described herein.

References (hereby expressly incorporated by reference thereto in their entireties for all purposes):

Reference 1: Firouzi, A., et al. Nature Commun., 9, 861 (2018).

Reference 2: Vanysek, P., Electrochemical Series, CRC Handbook of Chemistry and Physics, 2012.

Reference 3: Kareis et al., J. Am. Chem. Soc. 134, 2246 (2012).

Reference 4: Her et al., Inorg. Chem. 49, 1524 (2010).

The systems, methods, compositions, materials, and articles of manufacture above have been described in general terms as an aid to understanding details of preferred embodiments of the present invention. In the description herein, numerous specific details are provided, such as examples of components and/or methods, to provide a thorough understanding of embodiments of the present invention. Some features and benefits of the present invention are realized in such modes and are not required in every case. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed as new and desired to be protected by Letters Patent of the United States is:

1. An electrochemical cell, comprising:
    an anode;
    a cathode; and
    an electrolyte;
    wherein said anode includes a current collector having a surface; and
    a composite coupled to said surface, said composite including an electrochemically active material having a composition, a binder, and an electrically conductive material, wherein said composition comprises at least one composition represented by Formula I:

$A_x Mn_y M_k^j [Mn^m(CN)_{(6)}]_z \cdot (Vac)_{(1-z)} \cdot n(CH_3OH)$ (Formula I)

wherein, in Formula I, A includes one or more alkali metals Li, Na, or K; and each dopant M may include at least one independently selected alkaline earth metal Mg or Ca, a post-transition metal Al, Ga, In, Sn, or Pb, or a transition metal Sc, Ti, V, Cr, Fe, Co, Ni, Cu, Zn, Pd, Ag, or Cd having an average valence j; and
    wherein $0 < j \leq 4$, $0 \leq k \leq 0.1$, $0 < x \leq 4$, $0 < y \leq 1$, $0 < z \leq 1$, and $0 < n \leq 4$;
    wherein $x + 2(y-k) + jk + (m-6)z = 0$;
    wherein Formula I includes one or more $Mn(CN)_6$ complexes each including an Mn atom;
    wherein m is an average valence of said Mn atoms found in said one or more Mn(CN)6 complexes;
    wherein (Vac) identifies a $Mn(CN)_6$ vacancy;
    wherein each particular $Mn(CN)_6$ complex includes said Mn atom bonded to a plurality of cyanide groups; and
    wherein $CH_3OH$ identifies methyl alcohol; and
    further comprising one or more crystal structures of Formula I.

2. The electrochemical cell of claim 1 wherein said one or more crystal structures include a monoclinic phase having a lattice angle of greater than 95°.

3. The electrochemical cell of claim 1 wherein said one or more crystal structures include a plurality of grains each having a grain size greater than 200 nm.

4. The electrochemical cell of claim 3 wherein said grain size is greater than 1 micron.

5. The electrochemical cell of claim 4 further comprising one or more agglomerations of said plurality of grains into one or more particles and wherein each said particle includes a particle size greater than 5 microns.

6. The electrochemical cell in claim 1 wherein n is greater than x.

7. An electrochemical cell, comprising:
    an anode including a current collector having a surface; and
    a composite coupled to said surface, said composite including an electrochemically active material having a composition, a binder, and an electrically conductive material, wherein said composition comprises at least one composition represented by Formula I:

$A_x Mn_y M_k^j [Mn^m(CN)_{(6)}]_z \cdot (Vac)_{(1-z)} \cdot n(CH_3OH)$ (Formula I)

wherein, in Formula I, A includes one or more alkali metals Li, Na, or K; and each dopant M may include at least one independently selected alkaline earth metal Mg or Ca, a post-transition metal Al, Ga, In, Sn, or Pb, or a transition metal Sc, Ti, V, Cr, Fe, Co, Ni, Cu, Zn, Pd, Ag, or Cd having an average valence j; and
    wherein $0 < j \leq 4$, $0 \leq k \leq 0.1$, $0 < x \leq 4$, $0 < y \leq 1$, $0 < z \leq 1$, and $0 < n \leq 4$;
    wherein $x + 2(y-k) + jk + (m-6)z = 0$;
    wherein Formula I includes one or more $Mn(CN)_6$ complexes each including an Mn atom;
    wherein m is an average valence of said Mn atoms found in said one or more Mn(CN)6 complexes;
    wherein (Vac) identifies a $Mn(CN)_6$ vacancy;
    wherein each particular $Mn(CN)_6$ complex includes said Mn atom bonded to a plurality of cyanide groups; and
    wherein $CH_3OH$ identifies methyl alcohol; and
    further comprising one or more crystal structures of Formula I.

8. The electrochemical cell of claim 7 wherein said composite further includes an additive.

9. The electrochemical cell of claim 7 wherein said binder includes one or more components selected from the group consisting of vinylfluoride/hexafluoropropylene copolymer, polyvinylidenefluoride (PVDF), polyacrylonitrile, polymethylmethacrylate, polytetrafluoroethylene, styrene butadiene rubber-based polymer, mixtures thereof, and combinations thereof.

10. The electrochemical cell of claim 7 wherein said electrically conductive material includes one or more components selected from the group consisting of a graphitic carbon, an amorphous carbon, or a mixture thereof.

* * * * *